United States Patent [19]

Kim

[11] Patent Number: 5,041,531

[45] Date of Patent: Aug. 20, 1991

[54] TELECHELIC POLYMERIZATION OF EPICHLOROHYDRIN

[75] Inventor: Chung S. Kim, Sacramento, Calif.

[73] Assignee: The United States of America as represented by the Secretary of the Air Force, Washington, D.C.

[21] Appl. No.: 517,014

[22] Filed: Apr. 27, 1990

[51] Int. Cl.$^5$ ..................... C08G 65/22; C08G 65/24
[52] U.S. Cl. ..................... 528/408; 528/417
[58] Field of Search ................. 528/408, 417

[56] References Cited

U.S. PATENT DOCUMENTS

| | | | |
|---|---|---|---|
| 3,850,856 | 11/1974 | Dreyfuss | 528/408 X |
| 4,043,967 | 8/1977 | Berg | 528/408 X |
| 4,115,295 | 9/1978 | Robins et al. | 528/408 X |
| 4,126,631 | 11/1978 | Krespan et al. | 528/408 X |
| 4,569,990 | 2/1986 | Kasper et al. | 528/408 |

*Primary Examiner*—Earl Nielsen
*Attorney, Agent, or Firm*—Charles E. Bricker; Donald J. Singer

[57] ABSTRACT

A process for preparing polyepichlorohydrin which comprises polymerizing epichlorohydrin in the presence of a catalytic amount of 1,4-butaneditriflate. The resulting polymer can have a molecular weight of about 5,000 to about 15,000. The polymer is telechelic. It can be terminated with a broad variety of functional groups.

9 Claims, No Drawings

TELECHELIC POLYMERIZATION OF EPICHLOROHYDRIN

RIGHTS OF THE GOVERNMENT

The invention described herein may be manufactured and used by or for the Government of the United States for all governmental purposes without the payment of any royalty.

BACKGROUND OF THE INVENTION

This invention relates to a process for preparing epichlorohydrin polymers.

Previous studies of cationic polymerization of epichlorohydrin (ECH) indicate that the commonly used initiator systems, i.e., Lewis acid/alcohol or tertiary oxonium salt/alcohol complexes, give polyepichlorohydrin (PECH) having average molecular weights less than about 4000 wherein the terminal groups are primarily secondary alcohols. Further, the end groups are sterically hindered secondary alcohol groups and cannot be readily converted to other desired functionalities.

Accordingly, it is an object of this invention to provide a process for preparing polyepichlorohydrin.

It is another object of this invention to provide a process for preparing telechelic polyepichlorohydrin having molecular weights greater than about 5000.

It is a further object of this invention to provide a process for preparing telechelic polyepichlorohydrin having molecular weights greater than about 5000, and terminated with various functional groups.

Other objects, aspects and advantages of the present invention will become apparent to those skilled in the art from a reading of the following detailed description of the invention.

SUMMARY OF THE INVENTION

In accordance with the present invention, there is provided a process for preparing polyepichlorohydrin which comprises polymerizing epichlorohydrin in the presence of a catalytic amount of 1,4-butaneditriflate.

DETAILED DESCRIPTION OF THE INVENTION 1,4-Butaneditriflate (BDT):

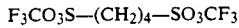

or 1,4-butane-di(trifluoromethylsulfonate), is prepared from tetrahydrofuran (THF) and trifluoromethanesulfonic anhydride ($Tf_2O$) by the dropwise addition of THF to $Tf_2O$ in a suitable solvent under an inert atmosphere at a reduced temperature, such as at 0° C. After complete addition of the THF, the reaction mixture is allowed to warm to ambient temperature. After removing the volatiles under vacuum, the crude product can be recrystallized from a suitable solvent.

In accordance with the invention, epichlorohydrin is polymerized in the presence of BDT, then terminated, or end-capped, with a desired terminating agent. The terminating agent includes water, aliphatic and aromatic alcohols, aliphatic and aromatic mercaptans, aliphatic and aromatic amines and carboxylic acids, as well as their respective alkali metal salts. Illustrative examples include water, saturated alcohols such as methanol, ethanol, propanol, isopropanol, butanol, phenol, cresol and the like; unsaturated alcohols including allyl alcohol, ethyleneglycol monoallyl ether, 3-butenyl alcohol, 2-hydroxyethyl acrylate and methacrylate, vinylbenzyl alcohol and the like; unsaturated phenols including vinyl phenol, allylphenol, allyloxyphenol and the like; unsaturated carboxylic acids including acrylic acid, vinylacetic acid, methacrylic acid, vinylbenzoic acid and the like; polyhydric alcohols including ethylene glycol, triethylene glycol, tripropylene glycol, glycerol, trimethylolpropane, tetramethylolpropane and the like; polyhydric phenols including resorcin, p-dihydroxybenzene, 2,4-toluenediol, 1,3,5-benzenetriol, 2,2'-bis(4-hydroxyphenyl)propane and the like; polyhydric carboxylic acids including adipic acid, sebacic acid, maleic acid, fumaric acid, 1,2 3-propane tricarboxylic acid α-hydroxysuccinic acid, terephthalic acid, 1,2,4-benzene tricarboxylic acid and the like; aliphatic and aromatic mercaptans such as hydrogen sulfide, butyl mercaptan, isobutyl mercaptan, thiophenol and the like; and aliphatic and aromatic amines, such as ethyl amine, diethyl amine, ethylisopropylamine, N-methyl-m-chloroaniline, and the like. These compounds are not intended to limit the scope of the invention, and in addition to these compounds, any other alcohols, thiols, amines or carboxylic acids may be used.

The reaction scheme of the process of this invention may be represented as follows:

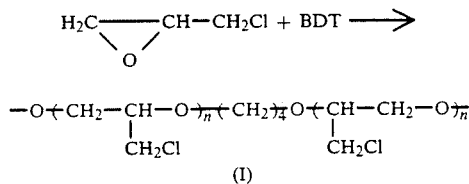

The integer n has a value of about 25 to 100, or greater. It will be understood by those skilled in the art that, during reaction and prior to end-capping, the polymer chain has terminal $-SO_2-CF_3$ groups.

The polymerization of the epichlorohydrin is carried out at a temperature of about 0° to 50° C., under anhydrous conditions for about 4 to 40 hours, preferably about 10 to 30 hours. Anhydrous conditions can be maintained in the reaction apparatus by using an inert, anhydrous atmosphere and by the addition of a dehydrating agent, such as calcium hydride, to the reaction mixture. The dehydrating agent can also serve to trap any triflic acid formed in the reaction mixture. In general, the ratio of initiator (BDT) to monomer, expressed in equivalents, can be about 1/5 to 1/100, preferably about 1/10 to 1/20.

It is within the scope of this invention to prepare block copolymers. Block copolymers may be prepared by polymerizing epichlorohydrin, as described previously, then adding an alkylene oxide or cyclic ether, such as tetrahydrofuran, to the reaction mixture and continuing the polymerization. Such block copolymers have the structure.

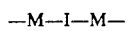

wherein I is the polymer structure I described previously and M is the second monomer block.

The following examples illustrate the invention. In the examples, epichlorohydrin and dichloromethane were distilled from calcium hydride, and tetrahydrofuran (THF) and dioxane were distilled from lithium aluminum hydride, under a nitrogen atmosphere. Ethyl triflate (ET), 99% purity, from Aldrich Chemical Co., was used without further purification.

EXAMPLE I

1,4-Butaneditriflate

To a flame-dried 500 ml three-necked flask, equipped with a 50 ml addition funnel, thermometer, argon inlet tube and magnetic stirring bar, was added 150 ml of dichloromethane, 1.0 g (0.024 moles) calcium hydride powder and 100 g (0.354 mole) of trifluoromethanesulfonic anhydride (Tf₂O) (T$_f$OT$_f$) (Aldrich Chemical Co., used without further purification). 30.7 g (0.425 mole) of tetrahydrofuran (THF) was added dropwise to the reaction mixture at 0° C. After complete addition of the THF, the reaction mixture was allowed to warm to room temperature. After removing the volatiles in vacuo, the crude product was recrystallized from dichloromethane.

Yield 83.7 g (68%) of colorless crystals: m.p. 35°–36° C.; purity 98%, based on GPC.

Analysis: Calc'd for $C_6H_8F_6O_6S_2$: C, 20.3; H, 2.3; F, 32.2; S, 18.1. Found: C, 19.85; H, 2.42; F, 32.20; S, 18.00.

$^1$H NMR (in $C_6D_6$) 3.73 (4 H, m) and 1.01 ppm (4 H, m).

$^{13}$C Proton Decoupled NMR: 25.1(s), 76.1(s) and 119 ppm(q).

IR in $CCl_4$: 1427, 1220, 1146 and 920 cm$^{-1}$.

EXAMPLE II

Polymerization of ECH

To a flame dried, 250 ml single-neck flask were added 0.228 g (0.011 equivalents) calcium hydride, 3.83 g (0.0216 equivalents) of BDT, 10 g of dichloromethane and 20.0 g (0.216 equivalents) of ECH. The reaction flask was placed in a 25° C. oil bath, equipped with an automatic shaker, and allowed to shake for 24 hours under an argon atmosphere.

The polymerization mixture was slowly added to a stirred mixture of 2.27 g (0.108 equivalents) CaH$_2$ powder, 9.74 g (0.216 equivalents) anhydrous butanediol and 29.2 g (0.332 equivalents) of anhydrous dioxane, under an inert atmosphere. The resulting mixture was placed in a 30° C. oil bath, equipped with an automatic shaker, and allowed to shake for 2 days under an inert atmosphere. The amount of terminating agent used was a ten-fold stoichiometric excess based on the BDT.

The reaction mixture was filtered and the polymer solution was washed with water until the wash water was neutral. The solvent was then removed using a rotary
evaporator at 40°–45° C. The residual polymer was washed three times with cold methanol, and then dissolved in a minimum amount of toluene followed by rotary evaporation of this solution using the vacuum of an oil pump at 50° C. until its weight remained constant. This polymer is listed in Table I, below, as polymer 4.

EXAMPLE III

A series of polymers was prepared generally following the procedure given in Example II, using BDT and ET (ethyl triflate) as the initiators. The results are given in Table I, below. In the Table, the term I/M is the initiator/monomer equivalent ratio, the yield is given in percent, after purification, and the number average molecular weight (Mn) was determined by gel permeation chromatography (GPC) using commercially available PECH and polystyrene standards as reference in THF.

TABLE I

| Polymerization of ECH Under Various Conditions | | | | | |
|---|---|---|---|---|---|
| Polymer | Initiator | I/M | Reaction Conditions | Yield, % | Mn |
| 1 | ET | 1/10 | 40° C./17 hr | 35 | 3,400 |
| 2 | ET | 1/20 | 40° C./17 hr | 35 | 7,000 |
| 3 | BDT | 1/10 | 40° C./17 hr | 40 | 6,400 |
| 4 | BDT | 1/10 | 25° C./24 hr | 50 | 6,900 |
| 5 | BDT | 1/20 | 25° C./17 hr | 50 | 15,000 |

Examination of the above data reveals that for a given I/M ratio and under the same reaction conditions, BDT provides a polymer having a molecular weight about two times the molecular weight of polymer prepared using ET.

EXAMPLE IV

The effect of terminating agents 1,4-butanediol (BD) and trimethylol propane (TMP) on the number average molecular weight and equivalent weight of PECH is shown in Table II, below. The number average molecular weight was determined by gel permeation chromatography (GPC) using commercially available PECH and polystyrene standards as reference in THF. The hydroxy equivalent weight was determined by a physical method in which the THF-associated OH peak was monitored by infrared spectroscopy ("Determination of Hydroxyl Concentrations in Prepolymers from the Infrared Absorption Band of Tetrahydrofuran-Associated Hydroxyl Groups", Chung Sul Youn Kim, Allan L. Dodge, Suk-fal Lau and Andrew Kawasaki, Anal. Chem. 1982, 54, 232–238) The polymerizations were carried out at 40° C. for 17 hours in dichloroethane.

TABLE II

| Polymer | Initiator | Terminating Agent | Mn | Mw/Mn | OH-Eq. Wt. |
|---|---|---|---|---|---|
| 1 | ET | BD | 3400 | 1.4 | 3610 |
| 2 | BDT | BD | 6400 | 1.5 | 3340 |
| 3 | BDT | TMP | 6400 | 1.5 | 1670 |

EXAMPLE V

A block copolymer of epichlorohydrin and tetrahydrofuran was prepared by first polymerizing ECH using an ECH:BDT equivalent ratio of 10:1 at 25° C. After 24 hours, tetrahydrofuran monomer was added to the reaction mixture. The resulting polymer, after 24 hours, had a Mn of 13,000.

Various modifications may be made to the invention as described without departing from the spirit of the invention or the scope of the appended claims.

I claim:

1. A process for preparing polyepichlorohydrin which comprises polymerizing epichlorohydrin in the presence of a catalytic amount of 1,4-butaneditriflate.

2. The process of claim 1 wherein said epichlorohydrin is polymerized at a temperature of about 20° to 50° C. for about 4 to 40 hours.

3. The process of claim 2 wherein the ratio of 1,4-butaneditriflate to epichlorohydrin is about 1/5 to 1/100 equivalents.

4. The process of claim 1 wherein polymerization is terminated with a terminating agent selected from the group consisting of water, aliphatic and aromatic alcohols and carboxylic acids, and their respective alkali metal salts, unsaturated alcohols, unsaturated phenols, unsaturated carboxylic acids, polyhydric alcohols, polyhydric phenols, polyhydric carboxylic acids, aliphatic and aromatic mercaptans, and aliphatic and aromatic amines.

5. The process of claim 3 wherein the ratio of 1,4-butaneditriflate to epichlorohydrin is about 1 to 10, wherein polymerization is carried out at 40° C. for 17 hours, and wherein the resulting polymer has a molecular weight of about 6400.

6. The process of claim 3 wherein the ratio of 1,4-butaneditriflate to epichlorohydrin is about 1 to 10, wherein polymerization is carried out at 25° C. for 24 hours, and wherein the resulting polymer has a molecular weight of about 6900.

7. The process of claim 3 wherein the ratio of 1,4-butaneditriflate to epichlorohydrin is about 1 to 20, wherein polymerization is carried out at 25° C. for 17 hours, and wherein the resulting polymer has a molecular weight of about 15000.

8. A process for preparing a block copolymer of epichlorohydrin and tetrahydrofuran which comprises polymerizing epichlorohydrin in the presence of a catalytic amount of 1,4-butaneditriflate, adding tetrahydrofuran monomer, and continuing polymerization.

9. The process of claim 8 wherein the ratio of 1,4-butaneditriflate to epichlorohydrin is about 1 to 10, wherein polymerization is carried out at 25° C. for 24 hours, wherein polymerization is continued for 24 hours after addition of said tetrahydrofuran, and wherein the resulting polymer has a molecular weight of about 13000.

* * * * *